A. F. WRIGHT.
STOVE PIPE SAFE THIMBLE.

No. 190,401. Patented May 1, 1877.

Witnesses. Inventor:

UNITED STATES PATENT OFFICE.

AMOS F. WRIGHT, OF CLEVELAND, OHIO.

IMPROVEMENT IN STOVE-PIPE SAFE-THIMBLES.

Specification forming part of Letters Patent No. 190,401, dated May 1, 1877; application filed January 31, 1877.

*To all whom it may concern:*

Be it known that I, AMOS F. WRIGHT, of Cleveland, in the county of Cuyahoga and State of Ohio, have invented a certain new and Improved Stove-Pipe Safe-Thimble; and I do hereby declare that the following is a full, clear, and complete description thereof, reference being had to the accompanying drawings, making part of the same.

Figure 1:
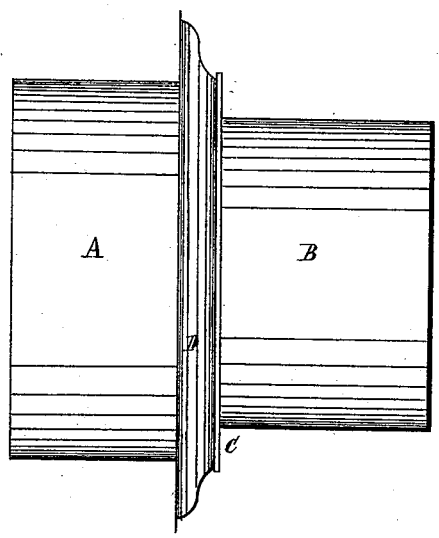
Figure 2:
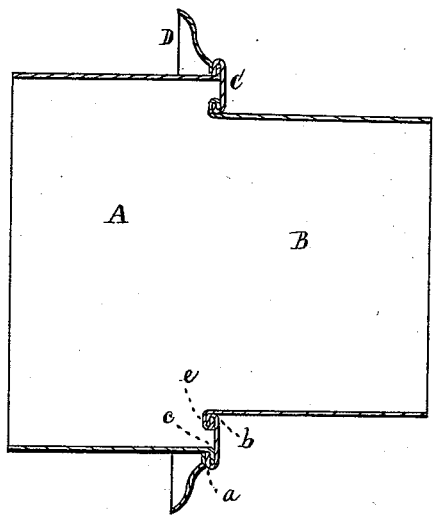

Figure 1 is a side view of the thimble. Fig. 2 is a transverse section.

Like letters of reference refer to like parts in the several views.

This invention is a safety-thimble for stove-pipes, and the purpose of which is not only to guard against fire, but also to render the thimble adaptable to stove-pipes differing in size. Said thimble is constructed substantially as follows:

Stove-pipes differ in size according to the size of the stove, as is well known, in view of which it frequently happens that the pipe-hole in a chimney or partition wall is a size or more too large for the pipe to be inserted therein.

The hole may be intended for a seven-inch pipe, whereas the pipe to be used therein may be only a six-inch one. This, as a consequence, leaves a space around the pipe, which must be filled with mortar, brick, &c., in order to be secure from fire, and prevent smoke, soot, and dust from issuing around the pipe, and to secure a better draft. It may sometimes happen that the hole in the chimney may be too small for the pipe to be inserted therein, in which event the hole must be either enlarged to suit the pipe, or the pipe be reduced in size to fit the hole. To avoid this trouble is the purpose of this invention, which consists in making the thimble in two sections, A B, Fig. 1.

It will be seen that section A of the thimble is much larger than section B. It may be of a size suitable for a seven-inch pipe, and section B may be of a size suitable for a six-inch pipe. The two sections are connected to each other by an annular clamp or ring, C, the outer and inner edges of which are turned in and back upon itself, to form a seam, as seen at *a b* in the drawings. The edge of one end of section A is turned at a right angle, as seen at *c*, and inserted in the fold of the ring C. The fold is rolled down upon it, thereby making a single lock-joint or seam.

The edge of one end of section B is also turned or folded, as shown at *e* in Fig. 2, which receives the turned-in edge of the ring. The two parts thus locked together are rolled down, forming a double seam, substantially as shown in the drawing, Fig. 2. The two sections thus connected to each other constitute a double thimble for connecting a stove-pipe to the pipe-hole in a chimney or flue. Thus, in the event the pipe to be used is a six-inch one, as seen at B, and the pipe-hole in the chimney be a seven-inch one, the end A of the thimble is inserted in the hole, allowing the end or section B to project therefrom, and to which the stove-pipe is attached in the usual way.

It will be obvious that by this means is avoided the insertion of the six-inch pipe in the seven-inch hole in the chimney, and chinking in around it brick and mortar, &c., to fill the large opening around the pipe, to make it secure against fire, and prevent smoke, soot, and dust from driving in around the pipe.

In the event a seven-inch pipe is to be used, and there is only a six-inch hole in the chimney, the small end, or section B, of the thimble is inserted in the hole, allowing the larger end, or section A, to project, in which the stove-pipe is inserted, instead of inserting the same in the hole. Thus is avoided the necessity of making a large hole in the chimney for the seven-inch pipe, which, in many rooms, would be not only a matter of expense, but attended with trouble and disfigurement of the wall.

D is an ordinary ring or collar, which is or may be used in connection with the thimble, as shown in the drawing, the same as when used on a stove-pipe, as a guard and finish to the connection of the pipe with the flue or wall.

What I claim as my invention, and desire to secure by Letters Patent, is—

A safety-thimble for stove-pipes, made of sheet metal, and consisting of two sections of pipe, A B, of unequal diameters, in combination with a ring, C, to which said sections are connected by lap-joints or seams $a$ and $b$, as herein described, and for the purpose specified.

AMOS F. WRIGHT.

Witnesses:
J. P. ABBOTT,
J. H. BURRIDGE.